United States Patent
Li et al.

(10) Patent No.: US 9,454,841 B2
(45) Date of Patent: Sep. 27, 2016

(54) HIGH ORDER FILTERING IN A GRAPHICS PROCESSING UNIT

(71) Applicant: QUALCOMM Incorporated, San Diego, CA (US)

(72) Inventors: Liang Li, San Diego, CA (US); Guofang Jiao, San Diego, CA (US); Yunshan Kong, San Diego, CA (US); Javier Ignacio Girado, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 14/452,326

(22) Filed: Aug. 5, 2014

(65) Prior Publication Data

US 2016/0042550 A1    Feb. 11, 2016

(51) Int. Cl.
| | |
|---|---|
| *G06T 15/04* | (2011.01) |
| *G06T 15/00* | (2011.01) |
| *G06T 1/20* | (2006.01) |
| *G06T 11/40* | (2006.01) |
| *G06T 5/20* | (2006.01) |

(52) U.S. Cl.
CPC ............ *G06T 15/005* (2013.01); *G06T 1/20* (2013.01); *G06T 5/20* (2013.01); *G06T 11/40* (2013.01); *G06T 2200/28* (2013.01)

(58) Field of Classification Search
USPC .................................................. 345/419, 426
See application file for complete search history.

(56) References Cited

U.S. PATENT DOCUMENTS

| | | |
|---|---|---|
| 7,274,373 B1 | 9/2007 | Bastos et al. |
| 7,623,136 B1 | 11/2009 | Chen et al. |
| 7,623,732 B1 * | 11/2009 | Thieret ............... G06T 1/20 358/3.26 |
| 7,782,334 B1 | 8/2010 | Kilgard et al. |
| 7,986,325 B1 * | 7/2011 | Gold .................. G06T 1/60 345/506 |
| 8,203,564 B2 | 6/2012 | Jiao et al. |
| 8,490,034 B1 * | 7/2013 | Torunoglu ......... G06F 17/5068 716/53 |
| 9,082,180 B2 * | 7/2015 | Cabral ............... G06T 5/004 |
| 2005/0063586 A1 * | 3/2005 | Munsil ............... H04N 1/4053 382/162 |
| 2007/0046682 A1 | 3/2007 | Brennan et al. |
| 2007/0080972 A1 | 4/2007 | Gruber |
| 2008/0143739 A1 * | 6/2008 | Harris ............... G09G 5/02 345/604 |
| 2009/0067509 A1 * | 3/2009 | Poon ................. G09G 3/3648 375/240.26 |
| 2009/0256848 A1 | 10/2009 | Iourcha et al. |
| 2010/0310168 A1 * | 12/2010 | Kass ................. G06T 7/403 382/168 |
| 2011/0234611 A1 | 9/2011 | Singhal et al. |

(Continued)

FOREIGN PATENT DOCUMENTS

EP    2365472 A2    9/2011

OTHER PUBLICATIONS

Sigg et al. "Fast Third-Order Texture Filtering", NVIDIA 2005.*

(Continued)

*Primary Examiner* — Kimbinh T Nguyen
(74) *Attorney, Agent, or Firm* — Shumaker & Sieffert, P.A.; James R. Gambale, Jr.

(57) ABSTRACT

This disclosure describes techniques for performing high order filtering in a graphics processing unit (GPU). In examples of the disclosure, high order filtering may be implemented on a modified texture engine of a GPU using a single shader instruction. The modified texture engine may be configured to fetch all source pixels needed for the high order filtering and blend them together with pre-loaded filtering weights.

28 Claims, 16 Drawing Sheets

(56) References Cited

U.S. PATENT DOCUMENTS

2011/0292048 A1 12/2011 Chien et al.
2015/0379763 A1* 12/2015 Liktor ................. G06T 15/80
  345/426

OTHER PUBLICATIONS

Heymann et al., "SIFT Implementation and Optimization for General-Purpose GPU," WSCG '2007: Full Papers Proceedings: The 15th international Conference in Central Europe on Computer Graphics, Visualization and Computer Vision 2007 in Co-Operation with Eurographics: University of West Bohemia Plzen Czech Republic, Jan. 29, 2007, XP055219348, pp. 317-322.
International Search Report and Written Opinion from International Application No. PCT/US2015/041163, dated Oct. 28, 2015, 11 pp.
"OpenGL Programming Guide: The Official Guide to Learning OpenGL, Version 1.1, Chapter 14," Jan. 1, 1997, 21 pp.
U.S. Appl. No. 14/452,281, by Li et al., filed Aug. 5, 2014.

* cited by examiner

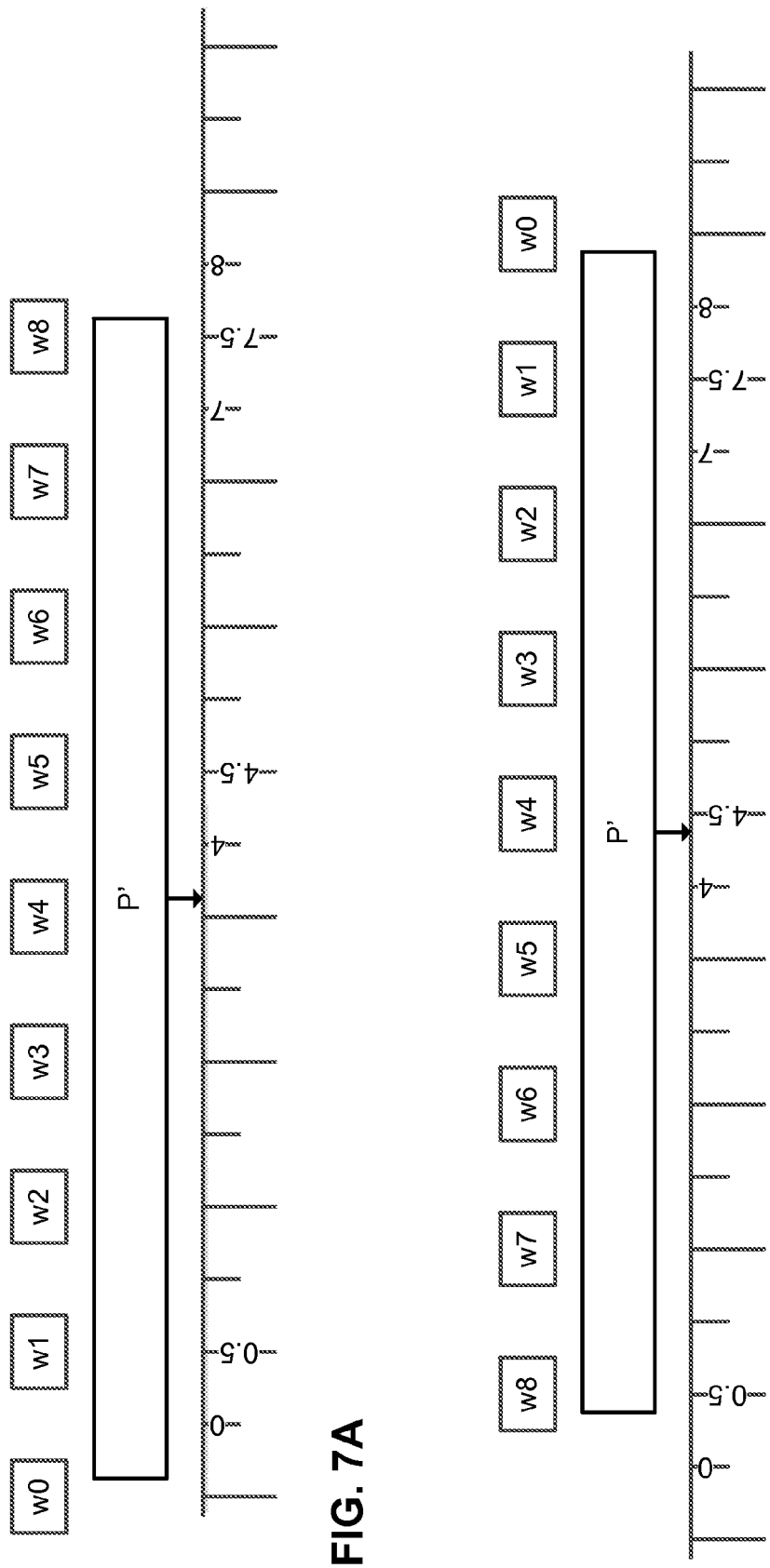

HIGH ORDER FILTERING IN A GRAPHICS PROCESSING UNIT

TECHNICAL FIELD

This disclosure relates to techniques for graphics processing, and more specifically to techniques for high order filtering.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. Converting information about 3D objects into a bit map that can be displayed is known as pixel rendering, and requires considerable memory and processing power. In the past, 3D graphics capability was available only on powerful workstations. However, now 3D graphics accelerators are commonly found in personal computers (PC), as well as in in embedded devices, such as smart phones, tablet computers, portable media players, portable video gaming consoles, and the like. Typically, embedded device have less computational power and memory capacity as compared to conventional PCs. As such, increased complexity in 3D graphics rendering techniques presents difficulties when implementing such techniques on an embedded system. Other tasks performed by GPUs include filtering tasks for image processing. Such filtering tasks are typically hardware and memory-intensive, particularly for GPUs operating in a mobile environment.

SUMMARY

This disclosure describes techniques for performing high order filtering in a graphics processing unit (GPU). In examples of the disclosure, high order filtering may be implemented on a modified texture engine of a GPU using a single shader instruction. The modified texture engine may be configured to fetch all pixels needed for the high order filtering of a source pixel and blend them together with pre-loaded filtering weights.

In one example of the disclosure, a method for performing high ordering filtering in a graphics processing unit (GPU) comprises receiving, by a GPU, a shader instruction to filter a source pixel, determining, by a texture engine of the GPU, a filter in response to the shader instruction, retrieving, by the texture engine of the GPU, neighboring pixels based on the determined filter, and filtering, by the texture engine of the GPU, the source pixel using the determined filter, the source pixel, and the retrieved neighboring pixels.

In another example of the disclosure, an apparatus configured to perform high ordering filtering comprises a memory configured to store graphics data, and a GPU configured to perform high order filtering on the graphics data in response to a shader instruction that instructs the GPU to filter a source pixel, the GPU further comprising a texture engine configured to determine a filter in response to the shader instruction, retrieve neighboring pixels based on the determined filter, and filter the source pixel using the determined filter, the source pixel, and the retrieved neighboring pixels.

In another example of the disclosure, an apparatus configured to perform high ordering filtering comprises means for receiving a shader instruction to filter a source pixel, means for determining a filter in response to the shader instruction, means for retrieving neighboring pixels based on the determined filter, and means for filtering the source pixel using the determined filter, the source pixel, and the retrieved neighboring pixels.

In another example of the disclosure, a GPU configured to perform high ordering filtering in response to a shader instruction comprises a memory configured to store graphics data, and a texture engine configured to determine a filter in response to the shader instruction, retrieve neighboring pixels based on the determined filter, and filter the source pixel using the determined filter, the source pixel, and the retrieved neighboring pixels.

In another example of the disclosure, a method of filtering in a GPU comprises receiving, by the GPU, an instruction to filter a source pixel, retrieving, by the GPU, neighboring pixels based on the instruction, packing, by the GPU, luma values of the source pixel and the retrieved neighboring pixels in an RGBA color format data structure, and performing, by the GPU, filtering on the luma values of the source pixel and the retrieved neighboring pixels using the RGBA color format data structure, wherein four luma values are filtered for each RGBA color format data structure.

In another example of the disclosure, an apparatus configured to perform filtering comprises a memory configured to store graphics data, and a GPU configure to perform filtering on the graphics data, the GPU further configured to receive an instruction to filter a source pixel, retrieve neighboring pixels based on the instruction, pack luma values of the source pixel and the retrieved neighboring pixels in an RGBA color format data structure, and perform filtering on the luma values of the source pixel and the retrieved neighboring pixels using the RGBA color format data structure, wherein four luma values are filtered for each RGBA color format data structure.

In another example of the disclosure, an apparatus configured to perform filtering comprises means for receiving an instruction to filter a source pixel, means for retrieving neighboring pixels based on the instruction, means for packing luma values of the source pixel and the retrieved neighboring pixels in an RGBA color format data structure, and means for performing filtering on the luma values of the source pixel and the retrieved neighboring pixels using the RGBA color format data structure, wherein four luma values are filtered for each RGBA color format data structure.

In another example, this disclosure describes a computer-readable storage medium storing instructions that, when executed, cause on or more processors of a device configured to perform filtering to receive an instruction to filter a source pixel, retrieve neighboring pixels based on the instruction, pack luma values of the source pixel and the retrieved neighboring pixels in an RGBA color format data structure, and perform filtering on the luma values of the source pixel and the retrieved neighboring pixels using the RGBA color format data structure, wherein four luma values are filtered for each RGBA color format data structure The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 7A and 7B are conceptual diagrams showing a kernel center of a symmetric filter with subpixel offset.

DETAILED DESCRIPTION

The demand for high quality and high resolution digital images continues to increase. Since high quality and high resolution digital images typically have large data sizes, hardware efficiency for performing image processing tasks becomes more important. One such image processing task is image filtering.

One common type of image filtering is convolutional filtering. In convolutional filtering, a two-dimensional (2D) filter mask is applied to pixel values (e.g., color values) of a center pixel and surrounding pixels. That is, the filter mask is a 2D matrix of filter weights, and each filter weight in the filter mask is applied to a corresponding pixel (e.g., with the currently filtered pixel in the center). Typically, filter mask are square in shape. The size of a filter mask is called a kernel size.

In convolutional filtering, each filter weight is multiplied by the corresponding pixel color value, and the result of each of these multiplications is added together as the filtered value for the current pixel. In some examples, the filtered value may be divided and/or have a bias value added to it. Different types of filtering may be achieved by varying the values of the filter weights in the filter mask. Example types of filtering include sharpening, edge finding, blurring, embossing, etc.

High ordering filtering (HOF) is convolutional filtering using a generalized filtering formula (e.g., that may be non-linear) on a large kernel size. A large kernel size may be defined as any filter kernel that is larger than 2×2 (e.g., greater than 4 filter coefficients). As such, performing HOF requires a relatively large number of filter weights as well as a large number of pixels surrounding the current pixel. In addition, HOF may require subpixel resolution support. Given these requirements for HOF, the major issue of existing solutions is hardware performance and power capabilities.

This disclosure proposes devices and techniques for perform low cost high order filtering (LCHOF) in a graphics processing unit (GPU). The LCHOF devices and techniques of this disclosure support the HOF through a single shader instruction. In one example of the disclosure, for each pixel to be filtered, a LCHOF-modified GPU is configured to fetch all involved pixels from local cache and blend them together by pre-loaded weights. The advantages of this approach include minimized shader resource usage, minimized the memory pressure, flexibility, and low cost in terms of additional hardware components needed.

Figure 1:
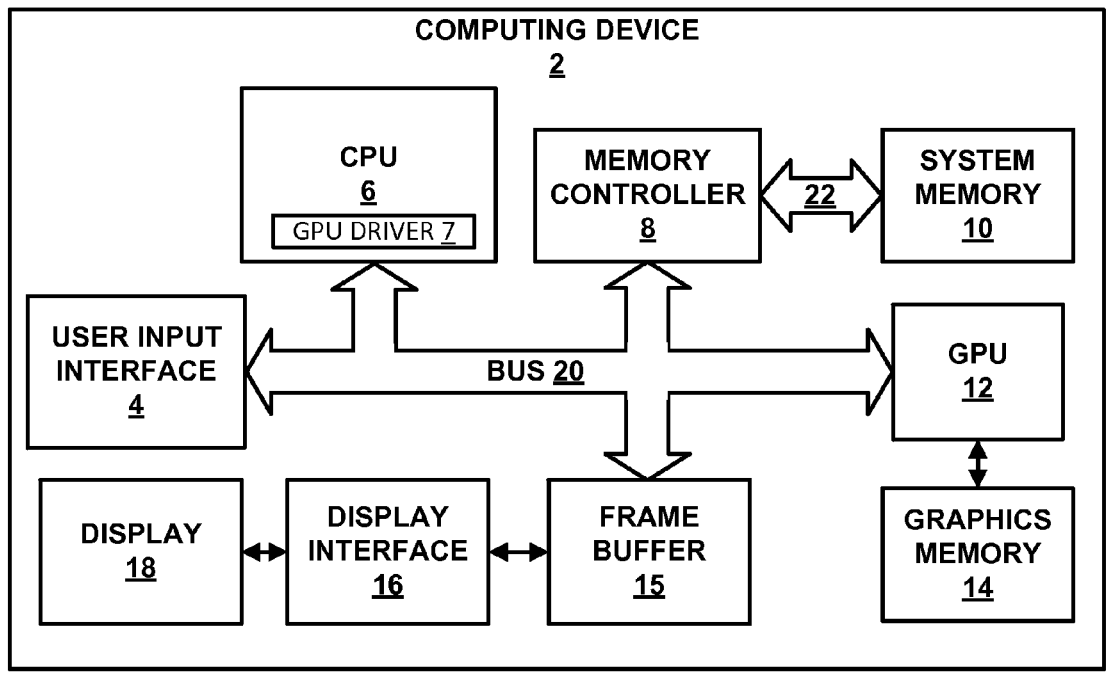
FIG. 1 is a block diagram showing an example computing device configured to use the techniques of this disclosure.

FIG. 1 is a block diagram illustrating an example computing device 2 that may be used to implement the techniques of this disclosure for high order filtering on a graphics processing unit (GPU). Computing device 2 may comprise, for example, a personal computer, a desktop computer, a laptop computer, a tablet computer, a computer workstation, a video game platform or console, a mobile telephone such as, e.g., a cellular or satellite telephone, a landline telephone, an Internet telephone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include user input interface 4, central processing unit (CPU) 6, memory controller 8, system memory 10, GPU 12, graphics memory 14, display interface 16, display 18 and buses 20 and 22. Note that in some examples, graphics memory 14 may be "on-chip" with GPU 12. In some cases, CPU 6, memory controller 8, GPU 12, and graphics memory 14, and possibly display interface 16 shown in FIG. 1 may be on-chip, for example, in a system on a chip (SoC) design. User input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute GPU driver 7 for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

In other examples, the software instructions that execute on CPU 6 may cause GPU 12 to execute a general purpose shader for performing more general computations applicable to be executed by the highly parallel nature of GPU hardware. Such general-purpose applications may be a so-called general-purpose graphics processing unit (GPGPU) and may conform to a general-purpose API, such as OpenCL Memory controller 8 facilitates the transfer of data going into and out of system memory 10. For example, memory controller 8 may receive memory read and write commands, and service such commands with respect to system memory 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer 15. Frame buffer 15 may be an independent memory or may be allocated within system memory 10. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computer device 2 via a wired or wireless communications link. For instance, display 18 may be a computer monitor or flat panel display connected to a personal computer via a cable or wireless link.

According to one example of the disclosure, and as will be explained in more detail below, GPU 12 may be configured to perform HOF using a shader instruction. For example, GPU 12 may be configured to receive a shader instruction to filter a source pixel, determine a filter in response to the shader instruction, retrieve neighboring pixels based on the determined filter, and filter the source pixel using the determined filter and the retrieved neighboring pixels. In one example of the disclosure, the determined filter comprises pre-computed filter weights stored in a register.

Figure 2:
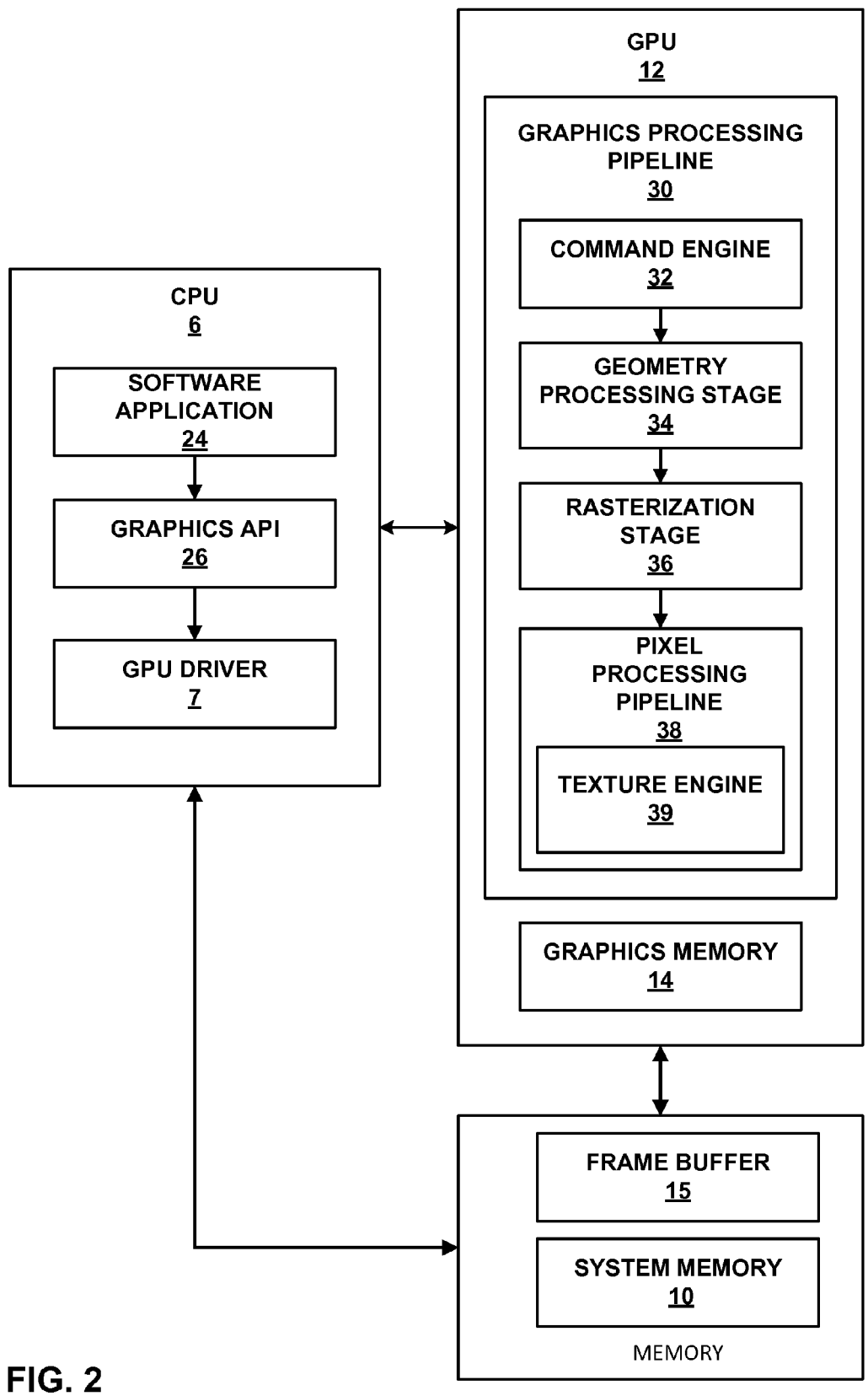
FIG. 2 is a block diagram showing components of FIG. 1 in more detail

FIG. 2 is a block diagram illustrating example implementations of CPU 6, GPU 12, and system memory 10 of FIG. 1 in further detail. CPU 6 may include at least one software application 24, graphics API 26, and GPU driver 7, each of which may be one or more software applications or services that execute on CPU 6. GPU 12 may include graphics processing pipeline 30 that includes a plurality of graphics processing stages that operate together to execute graphics processing commands. GPU 12 may be configured to execute graphics processing pipeline 30 in a variety of rendering modes, including a binning rendering mode and a direct rendering mode. As shown in FIG. 2, graphics processing pipeline 30 may include command engine 32, geometry processing stage 34, rasterization stage 36, and pixel processing pipeline 38. Pixel processing pipeline 38 may include texture engine 39. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10 and frame buffer 15. Frame buffer 15 may be a part of system memory 10 or may be separate from system memory 10. Frame buffer 15 may store rendered image data.

Software application 24 may be any application that utilizes the functionality of GPU 12. For example, software application 24 may be a GUI application, an operating system, a portable mapping application, a computer-aided design program for engineering or artistic applications, a video game application, or another type of software application that may utilize a GPU.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 15 associated with a display device. Graphics pipeline 30 may be configured to execute in one of a plurality of different rendering modes, including a binning rendering mode and a direct rendering mode.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

Graphics processing pipeline 30 may be configured to receive one or more graphics processing commands from CPU 6, via graphics driver 7, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Again, graphics pipeline 30 may be configured to execute in one of a plurality of different rendering modes, including a binning rendering mode and a direct rendering mode.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership test, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Texture engine 39 may included as part of pixel processing pipeline 38. Texture engine 39 may include both programmable and fixed function hardware designed to apply textures (texels) to pixels. Texture engine 39 may include dedicated hardware for performing texture filtering, whereby one or more texel values are multiplied by one or more pixel values and accumulated to produce the final texture mapped pixel. As will be explained in more detail below, this disclosure proposes modifications to texture engine 39 so that texture engine 39 may be used to perform LCHOF using a single shader instruction.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Although frame buffer 15 and system memory 10 are illustrated as being separate memory units, in other examples, frame buffer 15 may be part of system memory 10.

The following describes LCHOF techniques of the current disclosure, including LCHOF techniques implemented by a GPU modified to support HOF with a single shader instruction. In one example, this disclosure proposes implementing HOF by modifying the texture engine of a GPU (e.g., texture engine 39 of GPU 12) and utilizing already existing texture engine hardware (e.g., local cache with addressing and multiply sample fetch control unit). For performing HOF on a pixel, the techniques of this disclosure propose the use of a single shader instruction to cause texture engine 39 to loop through all involved surrounding pixels, fetch the surrounding pixels from local cache, and blend (e.g., multiply) the surrounding pixels together with pre-loaded/pre-computed filter weights.

As discussed above, the desire for high resolution and high quality in current image processing tasks requires hardware to perform the filtering efficiently with subpixel resolution support and large filtering kernels. Various commonly used HOF techniques can be represented by following equation. For each pixel(x,y), the filtering result f(x, y) is as follows:

$$f(x,y)=\Sigma_{i=0}^{m*n-1}(fweight(i,x,y)*pixel(fu(i,x),fv(i,y)))$$

The variables m, n are the filtering kernel size. The total samples involved in filtering is m*n. The functions fu(i,x) and fv(i,y) obtain the coordinates of sample pixels (e.g., the surrounding pixels) involved in the filtering of the current pixel (x,y). For example, for a simple 3×3 kernel, fu(i,x)=x−(i/3)+1, fv(i,y)=y−(i/3)+1. That is, the offset relative to center(x,y) are (−1,0,1) in both dimensions.

The function fweight(i,x,y) can be simplified to fweight(i) for most legacy filtering applications. That is, each sample pixel's filter weight will only be determined by its position (i) inside the kernel. A more advanced and general fweight (i,x,y) mapping may allow different weights to be specified for each pixel. For example, for subpixel resolution support, if the current pixel's coordinates(x,y) are not located in pre-defined kernel center, the relative offset will determine the current pixel's new weights, which can be derived from the original fweight(i) and (x-kernelcenter), (y-kernelcenter) by linear interpolation (or more precise formulas/curves defining the filtering, like a Gaussian curve). For anisotropic direction support, different kernels can be used for filtering each pixel. For example, different weights may be selected according to some pre-calculated direction information for the current pixel.

Previous techniques for HOF on a GPU (or other hardware) include a programmable (e.g., GPU shader) implementation and a fixed pipeline implementation. Both have drawbacks. For example, a programmable shader implementation in a GPU handles HOF with low efficiency. Obtaining surrounding pixels and filter weights for a large filtering kernel breaks down to multiple shader instructions. Each surrounding pixel involved in the filtering is fetched using a separate data load instruction. The filtering of each surrounding pixels (i.e., the multiplication of the pixel value with the filter weight) is performed by one or two instructions (e.g., a muladd instruction that combines a multiplication instruction and an add instruction). The major issue of this solution is the amount of hardware performance/power required considering the large amount of source data (i.e., surrounding pixels) and filter weights involved for HOF. It is preferable to minimize data transactions (calculating weights and intermediate results) inside the GPU shader execution path and minimize data transactions from the GPU to memory data path.

Shader based-solutions use shader instructions to perform filtering for each source data (i.e., multiplying surrounding pixels by filter weights produce intermediate results), and then blending all intermediate result using other shader instructions. This kind of solutions requires many shader resources to store/transfer weights and intermediate results. Another problem with shader-based solutions is that, due to the GPU execution order, source data cannot be fully utilized before being removed from local cache. As such, the same data may need to be fetched multiple times.

Considering the inefficiency of a shader-based implementation, a fixed pipeline implementation is another common choice to support HOF. In a fixed pipeline implementation, a completely new dedicated hardware pipeline may be added (e.g., to a GPU) to implement HOF. However, such a fixed design is limited to filtering operations and may not be flexibly used for other operations. Furthermore, the design of data bandwidth in a fixed filtering pipeline is difficult to adjust to obtain a good performance/power tradeoff. Another big concern for fixed pipeline implementations is cost. For many use cases, it is difficult to justify the need of a dedicated hardware for HOF, since HOF typically requires a large cache and related memory access logic units (e.g., latency hide FIFO buffers). A line buffer is widely used in this kind of fixed pipeline implementation to get better power and memory efficiency, but the cost of such a line buffer is also big if large filtering kernels are to be supported.

This disclosure describes techniques for low cost high order filtering (LCHOF) that may be implemented by GPU 12 without requiring multiple shader instructions or requiring additional dedicated fixed-function hardware for filtering. In examples of this disclosure, the LCHOF techniques may be implemented by one or more hardware units of GPU 12, including a shader processor and texture engine 39. The techniques of this disclosure may support high order filtering being performed on GPU 12 using single shader instruction, rather than multiple instructions that increase processing time. As will be described below, the LCHOF techniques may be implemented by altering existing GPU hardware (e.g., the texture engine) by adding a small amount of logic circuits to work in conjunction with existing local cache, addressing and loop control circuitry. In this way, the LCHOF techniques described in this disclosure function in conjunction with existing hardware of GPU 12 rather than requiring significant additional dedicated hardware for filtering. In examples of the disclosure that will be described in more detail below, GPU 12 may be configured to receive a shader instruction identifying a pixel to be filtered, determine the type and size of filter to be used, obtain pre-computed filter weights for the filter, and fetch any surrounding pixels needed based on the size of the determined filter.

Figure 3:
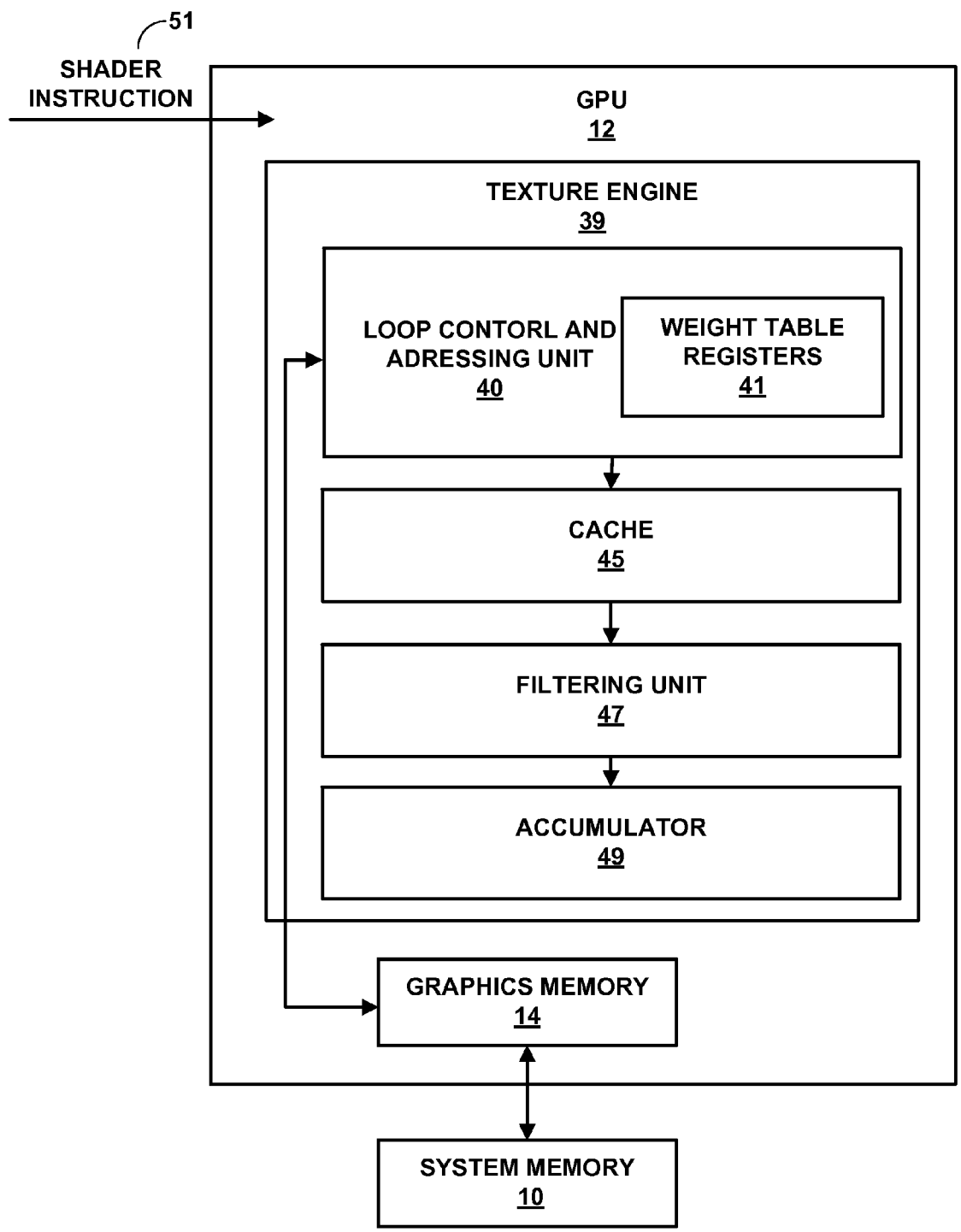
FIG. 3 is a block diagram showing an example texture engine configured to implement the techniques of this disclosure.

FIG. 3 is a block diagram showing an example of GPU 12 and texture engine 39 that have been configured to implement HOF according to the techniques of this disclosure. As shown in FIG. 3, texture engine 39 may include loop control and addressing unit 40, a cache 45, filtering unit 47, and accumulator 49. In accordance with the techniques of this disclosure, loop control and addressing unit 40 may be further modified to include, and/or have access to, weight table registers 41. That is, weight table registers may be internal or external to loop control and addressing unit 40. Weight table registers 41 represent part of the additional logic circuits that may be added to typical existing texture engine hardware to implement the HOF techniques of this disclosure.

As shown in FIG. 3, GPU 12 may receive shader instruction 51 that instructs GPU 12 to perform a filtering operation (e.g., an HOF operation). Shader instruction 51 may include an indicator (e.g., a virtual address or other indicator) of the current pixel value (e.g., source pixel value) that is to be filtered. It should be noted that this disclosure will generally describe a "pixel value" to be filtered. The "pixel value" to be filtered may be one or more color components that represent the color of the pixel that will be displayed. Any color format may be used to represent the color value.

In one example, a pixel value may be represented by an RGBA color format, where R represents the red value of the pixel color, G represents the green value of the pixel color, B represents the blue value of the pixel color, and A represents the alpha value (i.e., the depth value) of the pixel. In other examples, the pixel color value may be represented by a luma value (Y) and two chrominance values (e.g., U and V, or Cr and Cb). In some applications, it may desirable to filter each of the color values (e.g., each of RGBA). In other applications, it may be desirable to only filter one of the color values (e.g., only the luminance value Y in YUV or YCrCb color formats).

Once GPU 12 receives shader instruction 51, a shader processor of GPU 12 may pass the address of the current pixel (e.g., source pixel) to be filtered to loop control and addressing unit 40 of texture engine 39. Loop control and addressing unit 40 may be configured to determine a filter to be applied from weight table registers 41. Weight table registers 41 may include register entries that indicate a filter type, a filter size (e.g., a kernel size) and pre-computed filter weights. The kernel size indicated in weight table register 41 indicates to loop control and addressing unit 40 which pixels surrounding the current pixel are to be used for filtering the current pixels. Based on the kernel size, loop control and addressing unit 40 may fetch, one-by-one, all surrounding pixel values to be used in filtering the source pixel The surrounding pixels may be fetched from graphics memory 14 and/or system memory 10.

Loop control and addressing unit 40 may store the fetched surrounding pixel values, as well as the source pixel, in cache 45. Filtering unit 47 is configured to multiply a pixel within the filter kernel (i.e., the source pixel and the surround pixel) by the corresponding filter weight stored in weight table registers 41. The result of the multiplication is stored at accumulator 49. Subsequent results of multiplying a pixel value with a corresponding filter weight are added to the result currently being stored in accumulator 49 until all pixel values stored in cache 45 have been filtered. The final accumulated result in accumulator 49 may then be stored (e.g., in graphics memory 14) as the filtered value for the source pixel.

As mentioned above, texture engine 39 in FIG. 3 represents a texture engine that has been modified to implement the LCHOF techniques of this disclosure. One such modification is the addition of weight table registers 41 that may be configured to store information concerning a filter to be applied, including the filter type, the filter size, and pre-computed filter weights. In one example, the filter type, filter size, and pre-computed filter weights in weight table register 41 may be set by graphics driver 7 and/or software application 24. That is, the filtering to be applied may be controlled by setting control bits and storing filter weights in weight table registers 41. Weight table registers 41 may include the filter size (e.g., kernel size) as two values for the vertical and horizontal dimensions (e.g., M×N, where M is the horizontal dimension, and N is the vertical dimension). In other examples, weight table registers 41 may store a single value for filter size that is indicative of the total number of filter weights in the kernel (e.g., store the value of the product of M×N). In this example, the total filter kernel is assumed to be square. General examples of filter types control bits that may be stored in weight table registers 41 include control bits that may indicate if the filter kernel is (1) separable or non-separable, (2) isotropic or non-isotropic, and (3) symmetric or non-symmetric.

A separable filter is a filter where the filter weight value for each position in the kernel is equal to the weight in the M dimension multiplied by the weight in the N dimension. Therefore, if control bit(s) in weight table register 41 indicate that the filtering kernel is separable, fewer filtering weights need be stored in weight table register. That is, for a filter kernel of size M*N, an indication that the filtering kernel is separable means than only M+N filter weights are stored, rather than M*N weights for a non-separable filter.

If weight table registers 41 include control bit(s) that indicate that the filter is a separable filter, additional control bits may be used to indicate if the filter is isotropic or non-isotropic. An isotropic filter is a filter where the horizontal and vertical weights are separable and they are same. In the case where a filter is both separable and isotropic, the number of weights that needs to be stored in weight tables registers can be downsized from M+N (separable, but non-isotropic filter) to M weights (separable and isotropic).

Similar to isotropic filters, if weight table registers 41 include control bit(s) that indicate that the filter is a separable filter, additional control bits may be used to indicate if the filter is symmetric or non-symmetric. A symmetric filter has the same weights on either side of a center axis (either horizontal or vertical). A symmetric filter may be isotropic or non-isotropic. For symmetric filters, only half the typical number of filter weights need to be stored in weight table registers 41. For example, a separable filter that is non-isotropic and symmetric would need to store (M+N)/2 filter weights. A separable filter that is isotropic and symmetric would need to store M/2 filter weights.

Figure 4:
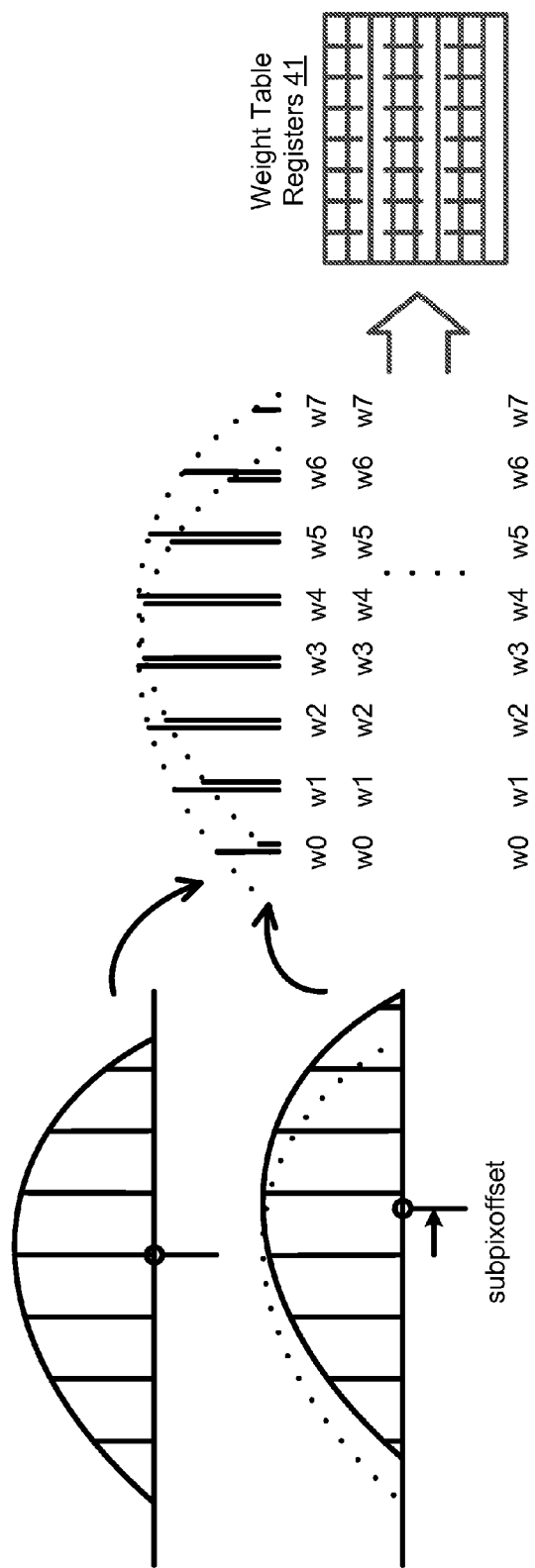
FIG. 4 is a conceptual diagram showing the derivation of filter weights with subpixel offsets.

Another filter weight storage optimization in this disclosure is for subpixel resolution, where weight table registers 41 only needs to store half of weights sets. The other half of the weights when using a subpixel offset may be derived from stored half. FIG. 4 is a conceptual diagram showing the derivation of filter weights with subpixel offsets. In FIG. 4, the height of the curved line represents the value of the filter weight. The vertical lines represent the position of the texels. A subpixel offset value (subpixoffset) may be defined that essentially moves the texels to a different portion of the weight curve. Multiple subpixel offset values may be stored in weight table registers 41 to essentially provide multiple different sets of filter weights.

Figure 5:
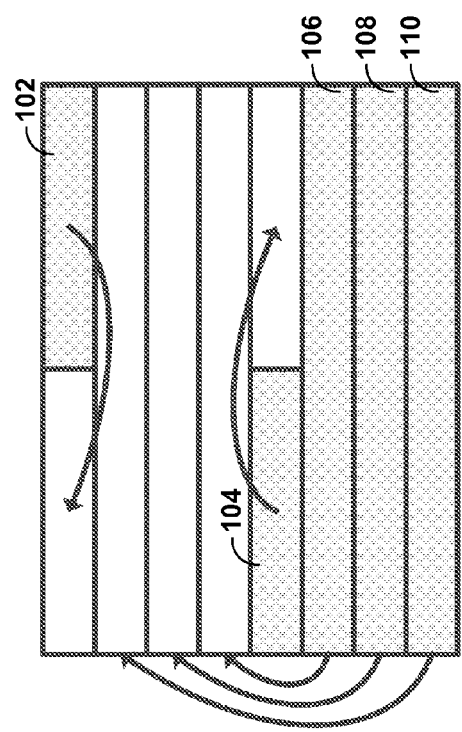
FIG. 5 is a conceptual diagram illustrating mirrored filter weights.

As discussed above, for some filter types, less than all the number filter weights needed may be stored in weight table registers 41. In this case, texture engine 39 may configured to derive the additional number of filter weights needed from those stored in weight table registers 41 based on the indicated filter type. FIG. 5 is a conceptual diagram illustrating techniques for mirroring or generally deriving filter weights for symmetric filters. For example, for filter that is symmetric about a vertical axis, filter weights from areas 102 and 104 may be mirrored about the vertical axis. As another example, for a filter that is symmetric about a horizontal axis, filter weights in areas 106, 108 and 110 may be mirrored about a horizontal axis.

In accordance with the HOF techniques of this disclosure, the addressing block of loop control and addressing unit 40 of texture engine 39 may be configured to generate and/or fetch the necessary samples (e.g., the surrounding pixel values) for filtering the source pixel. As discussed above, the source pixel, or location of the source pixel, may be provided to texture engine 39 from shader instruction 51. Loop control and addressing unit 40 is configured to access weight table registers 41 to determine a filter type and a filter size. Based on the location of the source pixel, the determined filter type, and the determined filter size, loop control and addressing unit 40 fetches all samples (e.g., surrounding pixels) needed to perform the filtering. Each sample may breakdown to a basic processing unit, which in one example, is four pixels.

Figure 6A:
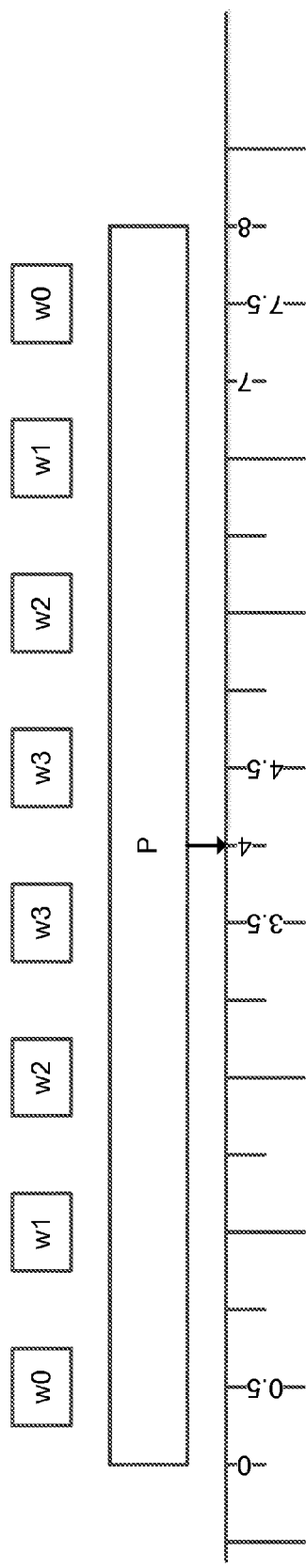
FIGS. 6A and 6B are conceptual diagrams showing a kernel center of a symmetric filter.

Based on the determined filter and filter size, loop control and addressing unit 40 fetches the surrounding pixels based on a determined kernel center and any indicated subpixel support indicated in weight table registers 41. For subpixel resolution filtering (e.g., as indicated by control bits in weight table registers 41), loop control and addressing unit 40 may be configured to determine the location of sample pixels corresponding to the filtering weights when the source samples' distance relative to pixel position are changed due to snapping source sample coordinates to integer coordinates. For example, FIG. 6A shows a filter kernel that has an even number of weights in one dimension. In this example, loop control and addressing unit 40 may define a position of pixel P, so that the filter weights (w0-w3) are evenly distributed on both sides as kernel center (in this case, at location 4.0). In FIG. 6A, a symmetric filter is indicated in weight table registers 41, thus filter weights w0-w3 are mirrored on either side of the kernel center.

Figure 6B:
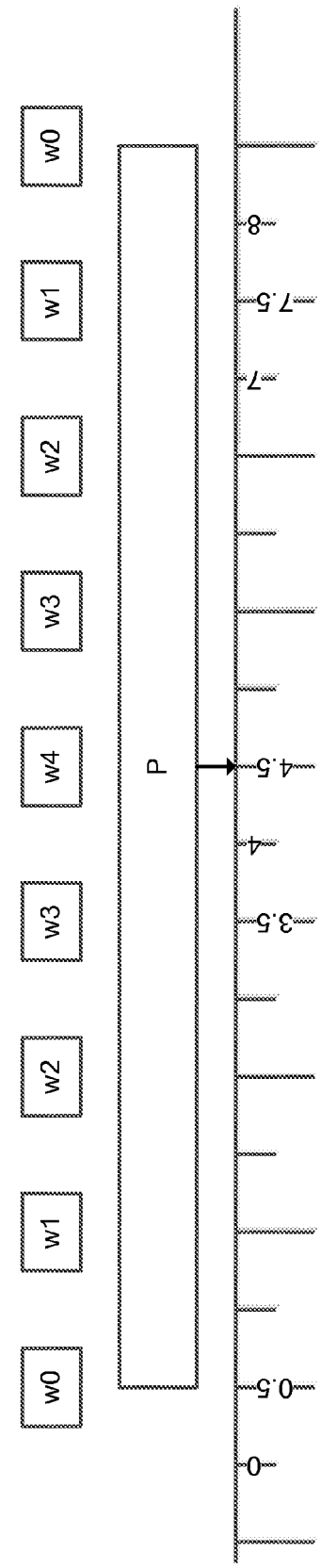

Another symmetric case filter example is shown in FIG. 6B. In this example, the kernel size includes nine filter weights in one dimension. The kernel center in FIG. 6B is at location 4.5, corresponding to a unique filter weight w4. Filter weights w0-w3 are mirrored on either side of the filter center. For subpixel resolution support, an offset may be defined relative to a kernel center. In this case, filter weights may be mirrored to the right side of the kernel center.

As shown in FIG. 7A, the kernel center at pixel P' is moved to the left of the kernel center (at location 4.0) by a subpixel offset value. In FIG. 7B, the pixel P' is moved to the right of kernel center 4 by a subpixel offset value. The weights in FIG. 7B are mirrored relative to the weights in FIG. 7A, because the position of pixel P' is symmetrical to the kernel center at location 4.0.

In summary, in accordance with the techniques of this disclosure, a method for performing high ordering filtering in GPU 12 is described. The method may include receiving, by GPU 12, a shader instruction 51 to filter a source pixel, determining, by texture engine 39 of the GPU 12, a filter in response to the shader instruction. Texture engine 39 may determine the filter from control bits stored in weight table registers 41. Texture engine 39 may be further configured to retrieve neighboring pixels based on the determined filter, and filter the source pixel using the determined filter, the source pixel, and the retrieved neighboring pixels.

Returning to FIG. 3, a specific example hardware implementation of weight table registers 41 of texture engine 39 will now be described. As discussed above, weight table registers 41 may include a plurality of registers that include control bit(s) that indicate the filter type, the filter size (e.g., the kernel size), and the filter weights themselves. Weight table registers 41 may be populated by GPU driver 7 and/or software application 24 executing on CPU 6. In some examples, weight table registers 41 may be populated by a shader program executing on GPU 12.

In an example implementation, weight table registers 41 may include the following registers:

1) Filter Type Registers: The filter type registers include control bits that indicate various types of filters. For example, the control bits may indicate whether or not the filter is separable, isotropic, or symmetric. The filter type registers may further include control bits that indicate whether or not sub-pixel filtering is supported. As described above, certain filter type may allow for fewer than all of the filter weights to be stored, as only a portion of the filter weights needed may be used to mirror, or generally derive the remaining filter weights needed.

2) Filter Size Registers: The filter size registers include control bits that indicate the size of the filter kernel. The size if the filter kernel may be indicated in two directions (e.g., labeled U and V). As such, a filter kernel is not necessarily square, but may be rectangular. In addition, other shape filter kernels are possible by making certain filter weights zero value.

3) Filter weights registers: The filter weight registers include the filter weights themselves.

Loop control and addressing unit 40 may be configured to utilize the information in weight table registers 41 as follows. Initially, loop control and addressing unit 40 may be configured to determine how many passes (loops) through texture engine 39 are needed given the indicated filter type and filter size in weight table registers 41. Loop control and addressing unit 40 is also configured to determine which pixels will be fetched for each loop according to filter size and filter type information from weight table registers 41.

Figure 8:
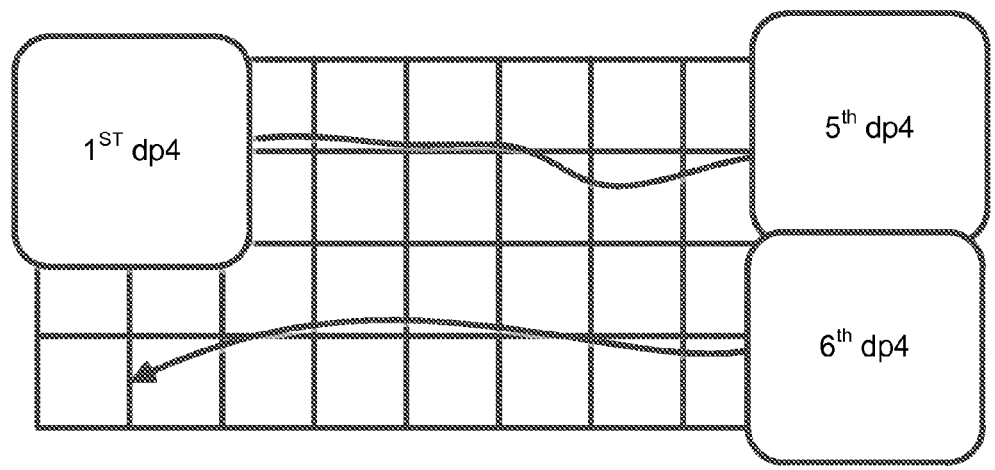
FIG. 8 is a conceptual diagram showing pixel fetching techniques of the disclosure.

In one example, texture engine 39 may be configured to process four pixels (i.e., a four pixel basic processing unit) in each loop. Other example texture engines may be configured to process more or fewer pixels per loop. In the example of a four pixel basic processing unit, all pixels involved in the filtering operation indicated by weight table registers 41 breakdown to one or more four pixel blocks. To improve the locality and efficiency of cache fetch, four pixel blocks may be fetched in the scan order shown in FIG. 8. FIG. 8 shows an example fetching order of four pixel blocks (labeled as dp4), where a first row of four pixel blocks is fetched starting with the $1^{st}$ dp4. In the example of FIG. 8, the kernel size is 20 pixels wide in the U direction. After the $5^{th}$ dp4 (i.e., the fifth four pixel block) is fetched, the next four pixel block to be fetched is in the row directly below the $5^{th}$ dp4. Loop control and addressing unit 40 would then fetch four pixel blocks from the next row in the opposite direction (i.e., from right to left). Each four pixel block fetched by loop control and addressing unit 40 will be stored in cache 45. The four pixel block stored in cache 45 will be sent to filtering unit 47 to apply the related filter weights, and then accumulator 49 will add the results of the weights being applied to the four pixel block to the total of previous filtering results.

As described above, the weights for each loop of texture engine 39 (e.g., processing four pixel blocks) are selected from a pre-defined weight table which can be derived from weight values stored in weight table registers 41. To save hardware cost and improve the efficiency of loading those weights, the weight values stored in weight table registers 41 may be compressed according to the filter type (e.g., symmetric/separable/isotropic/subpixel precision). Then, loop control and addressing unit 40 may derive all filter weights needed for a particular filter type (e.g., as discussed above with reference to FIG. 5).

In some examples, to improve the quality of filtering, the pre-stored filter weights in weight table registers 41 may be upscaled before filtering. After filtering, the completed filtered value may then be scaled down. For example, a 16*16 kernel which generates a result by averaging all involved pixels will have each pixel's weight divided by 256 (i.e., 1/(16*16)=1/256). By utilizing upscaling, each weight may be adjusted to 1 to obtain a higher precision on intermediate results. The final result will be scaled down by 1/256 in accumulator 49.

In other examples, the HOF techniques of this disclosure may be applied to multi-sample anti-aliasing (MSAA) surfaces, with a slight definitional change for symmetric filters. For an MSAA surface, each pixel value may be made up of a plurality of subsamples. In this example, the filter weights used for the MSAA surface may be non-separable, but still may be symmetric. When applying HOF on an MSAA surface, each filter weight corresponds to one of the subsamples in MSAA surface. The U dimension weights may be expanded by multiplying the kernel size by the number of samples in the MSAA surface. The V dimension weights will be the same as in the non-MSAA case.

Figure 9:
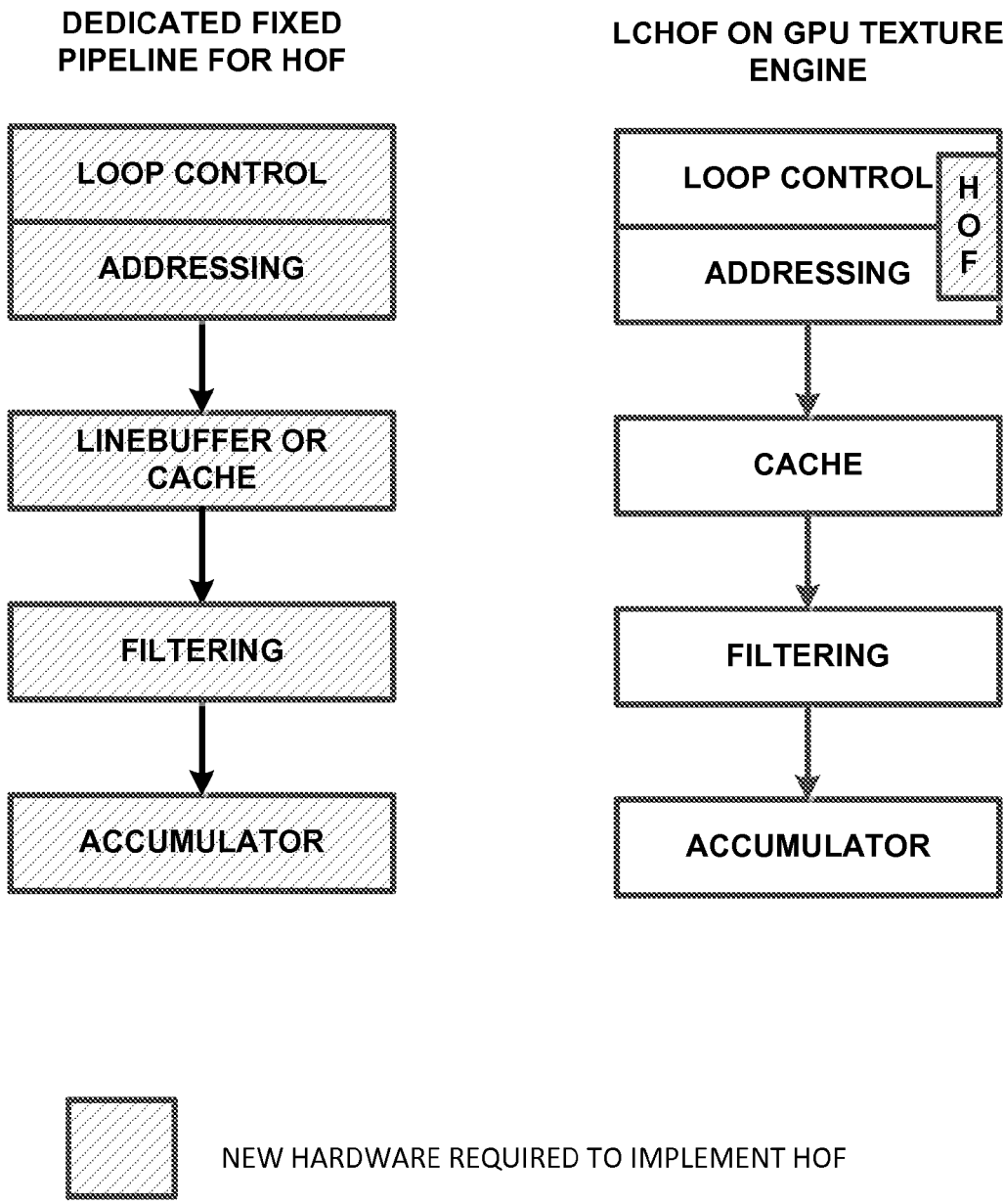
FIG. 9 is a conceptual diagram showing hardware cost advantages of the techniques of the present disclosure.

FIG. 9 is a conceptual diagram showing one advantage of this disclosure's techniques for using the modified texture engine 39 to perform high order filtering. As shown in FIG. 9, to perform high order filtering using a completely dedicated fixed pipeline, completely new hardware would be required for loop control, addressing, cache, filtering, and accumulation. Instead, using existing modified texture engine according to the techniques of this disclosure, high order filtering may be achieved with minimal additional hardware (i.e., mainly the addition of weight table registers 41).

Figure 10:
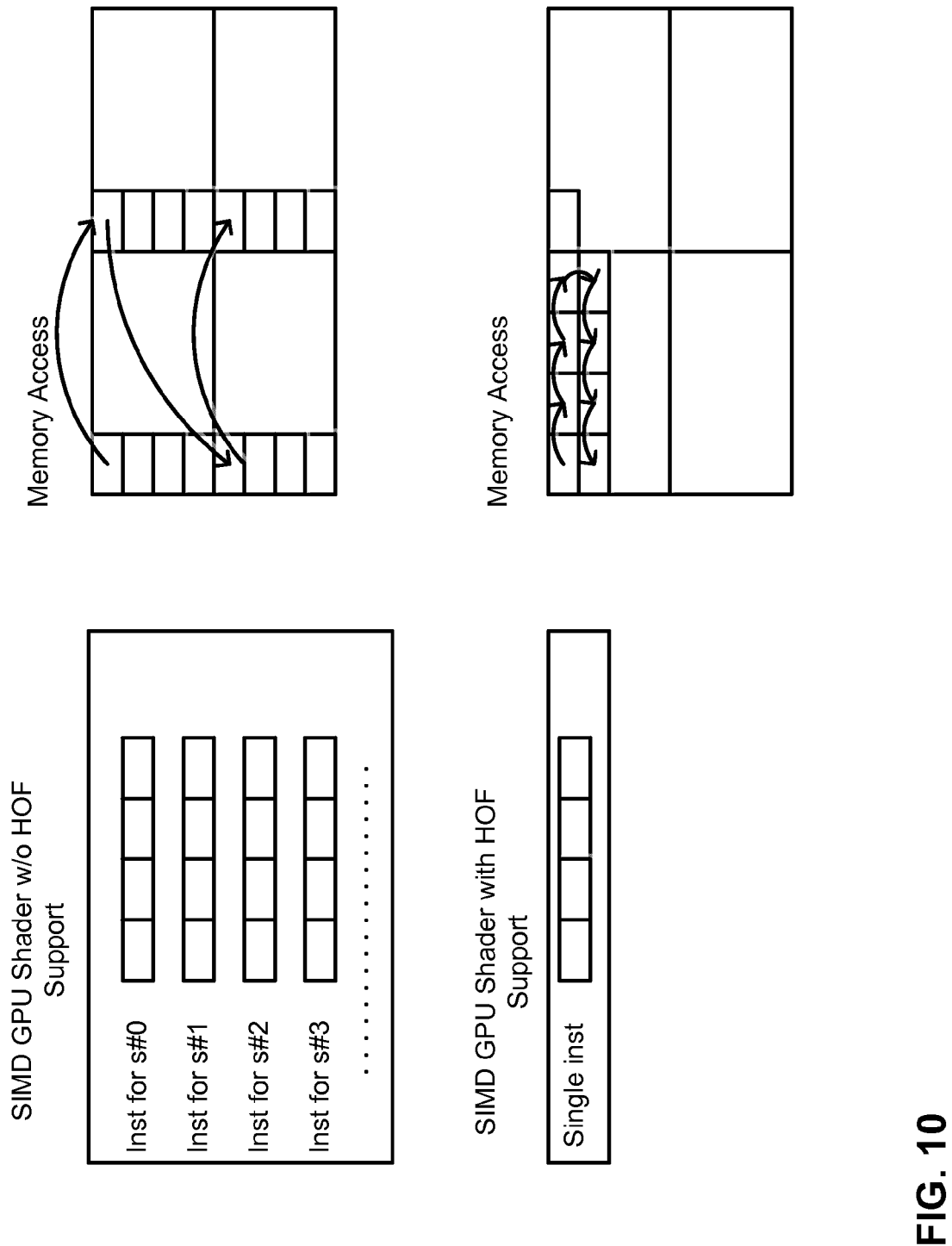
FIG. 10 is a conceptual diagram showing memory fetching advantages of the techniques of the present disclosure.

FIG. 10 is a conceptual diagram showing another advantage of this disclosure's techniques for using a single shader instruction and a modified texture engine 39 to perform high order filtering. In conventional shader-based solutions for high order filtering (i.e., not with the HOF techniques of this disclosure), multiple shader instructions were needed to perform each pixel fetch, weight determination, pixel/weight multiplication, and accumulation. As such, memory access for fetches and stores of intermediate results (i.e., pixel/weight multiplication and accumulations), utilized a great deal of memory in widespread memory locations. However, using the HOF techniques of this disclosure, memory accesses are limited to fetching neighboring pixels, which are likely to be stored closely together in memory. This because all intermediate final results of the filtering are stored in a local cache in texture engine 39. As such, the techniques of this disclosure provide for more efficient memory usage.

In another aspect of this disclosure, filtering throughput may be improved for some use cases by packing luma values of pixels into a filter framework that is configured to filter all four values of an RGBA (red, blue, green, alpha (depth)) pixel value data structure.

Figure 11:
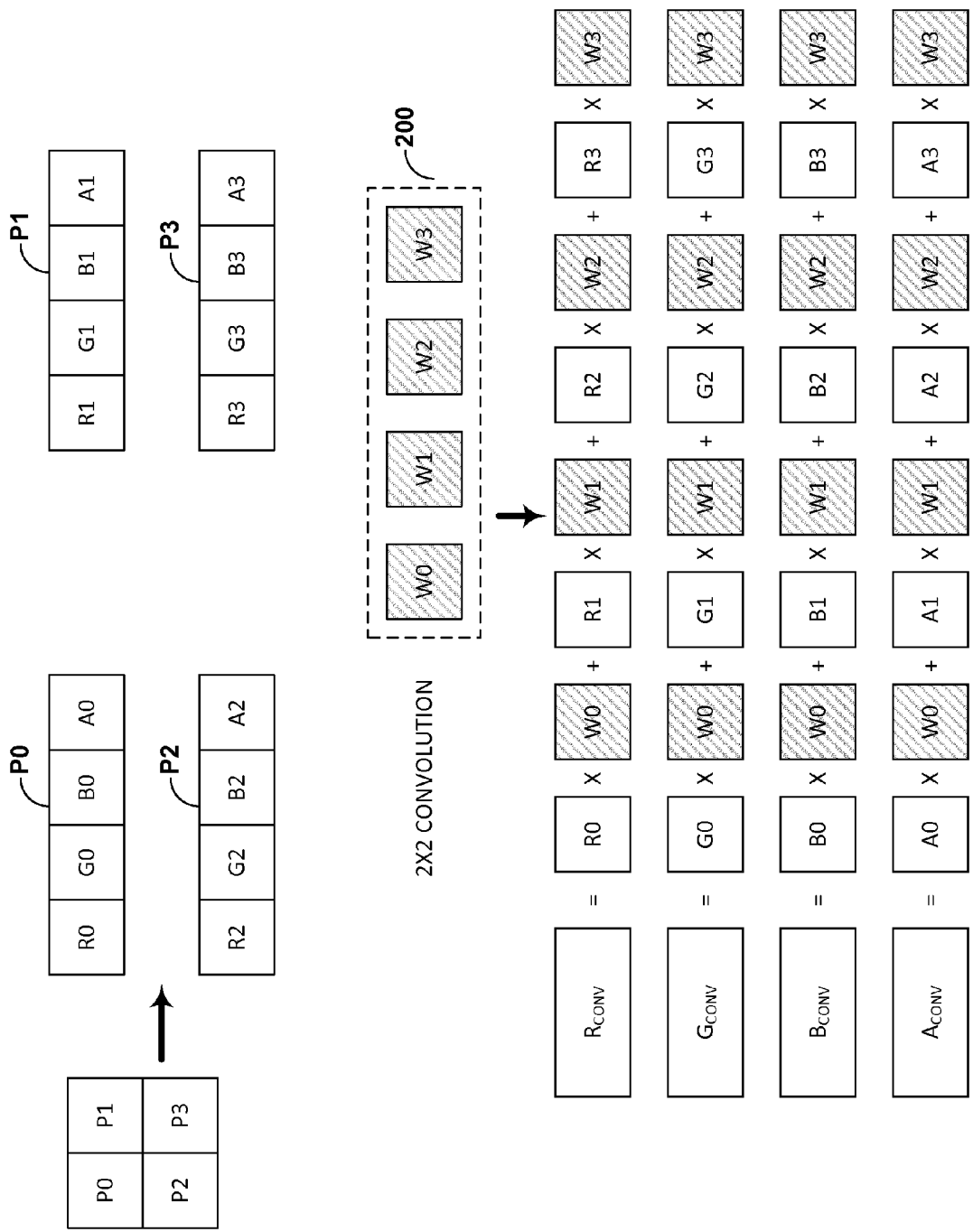
FIG. 11 is a conceptual diagram showing convolutional filtering techniques for an RGBA pixel format.

FIG. 11 is a conceptual diagram showing a convolutional filtering example (e.g., high order convolutional filtering), whereby a texture engine (e.g., texture engine 39) is configured to apply filtering to each of an R, G, B, and A component of a pixel value at the same time. That is texture engine 39 may be configured to perform high order filtering using an RGBA color format data structure. As can be seen in FIG. 11, pixels P0-P3 may each be made up of an R, G, B, and A value. When applying filter weights 200 (W0-W3) to pixels P0-P3 to perform a 2×2 convolution, each of weights W0-W3 is applied equally to each of the respective R, G, B, and A values for each pixel. That is, to produce the filtered value for the R component ($R_{CONV}$), weight W0 is applied to R0 of pixel P0, weight W1 is applied to R1 of pixel P1, weight W2 is applied to R2 of pixel P2, and weight W3 is applied to R3 of pixel P3. Similarly, to produce the filtered value for the G component ($G_{CONV}$), weight W0 is applied to G0 of pixel P0, weight W1 is applied to G1 of pixel P1, weight W2 is applied to G2 of pixel P2, and weight W3 is applied to G3 of pixel P3. This process is repeated to produce filtered values for each the B ($B_{CONV}$) and A ($A_{CONV}$) components.

The techniques shown in FIG. 11 provide for parallel processing of each color component of an RGBA pixel. Such a processing structure works well when both the input pixel values and the filtered output pixel values are in an RGBA color format. However, in some application, such as video data, pixel values are not stored in an RGBA color format, but are rather stored in a color format consisting of a luma value (e.g., designated as Y), and one or more chroma components (e.g., designated as U and V, or designated as Cr and Cb). When pixel values are stored in such a format, it may only be desirable to filter the luma components of each pixel. If only the luma component of each pixel is filtered, the parallel processing structure of texture engine 39 would not take advantage of the hardware designated for filtering the G, B and A components (i.e., assuming that the hardware designated for filtering the R component is used for the luma component).

Given that texture engine 39 may be configured to filter four color components (e.g., RGBA) at the same time, this disclosure proposes techniques to increase the throughput of filtering luma components of pixels stored in a YUV or YCrCb color formats by packing luma components of four pixels into one RGBA color format data structure. In this way, the luma components for four pixels may be filtered at the same time. In some examples, the pixels to be filtered are already stored in a color format that includes luma components. In other examples, GPU 12 or CPU 6 may be configured to convert pixel values from an RGBA format to a format that includes luma components (e.g., YUV or YCrCb). The packing techniques of this disclosure may be used in conjunction with the HOF techniques described above (e.g., where filter types and weights are retrieved from a weight table register based on a single shader instruction). However, the packing techniques of this disclosure may be used with other filtering techniques, including those filtering techniques where filter weights are calculated/derived by GPU 12.

Figure 12:
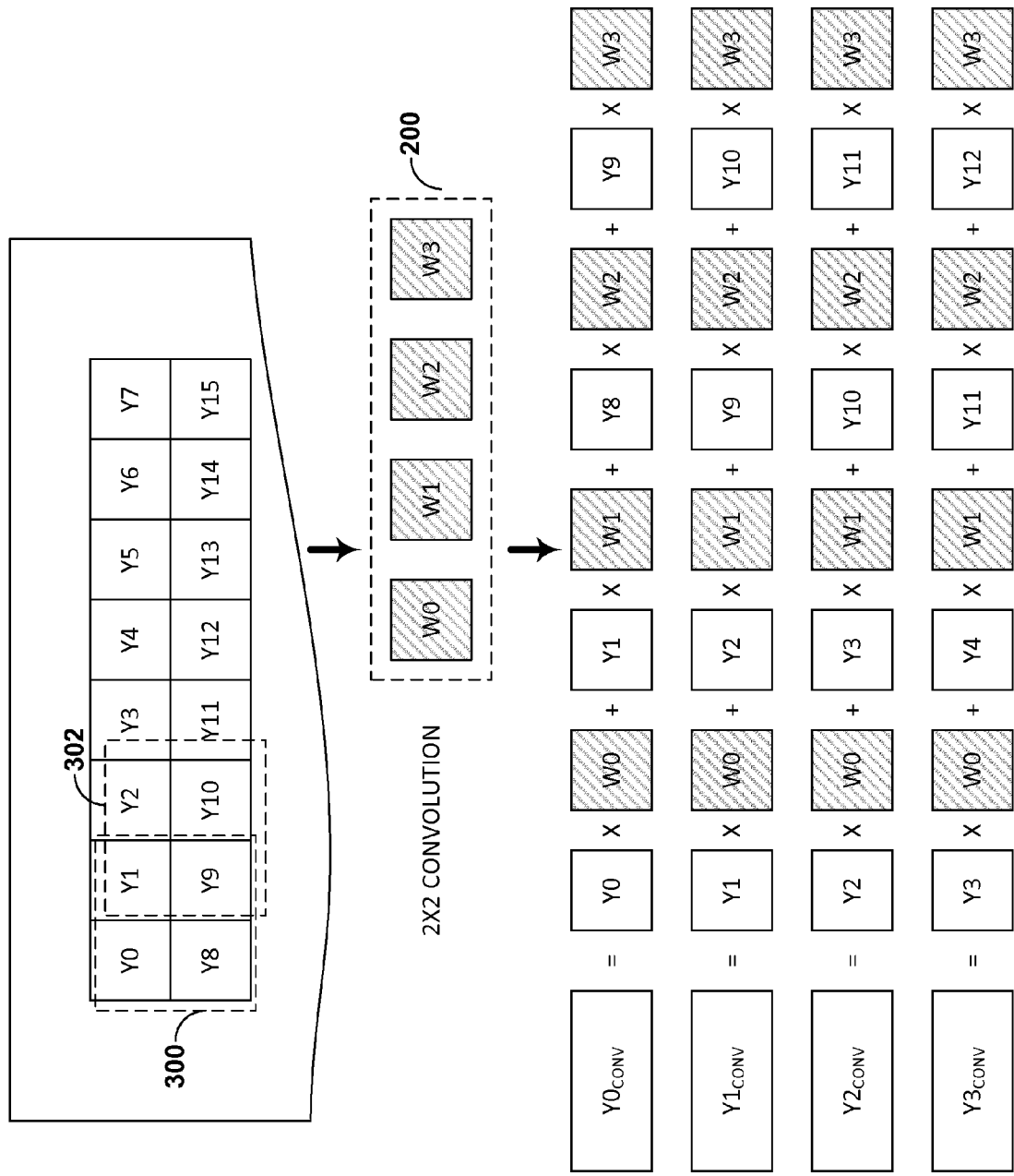
FIG. 12 is a conceptual diagram showing convolutional filtering techniques for a luma-based pixel format.

FIG. 12 is a conceptual diagram that shows convolutional filtering techniques on luma values. As shown in FIG. 12, 2×2 convolutional filtering may be applied to each of luma values Y0, Y1, Y2 and Y3 using filter weights W0-W3 200. Luma values Y0-Y3 are luma components of four respective source pixels. To produce the filtered value $Y0_{CONV}$, block 300 consisting of source pixel Y0 and neighboring pixels Y1, Y8 and Y9 are used. To produce the filtered value for the Y0 luma value ($Y0_{CONV}$), weight W0 is applied to Y0, weight W1 is applied to Y1, weight W2 is applied to Y8, and weight W3 is applied to Y9. Similarly, to produce the filtered value $Y1_{CONV}$, block 302 consisting of source pixel Y1 and neighboring pixels Y2, Y9 and Y10 are used. To produce the filtered value for the Y1 luma value ($Y1_{CONV}$), weight W0 is applied to Y1, weight W1 is applied to Y2, weight W2 is applied to Y9, and weight W3 is applied to Y10.

Figure 13:
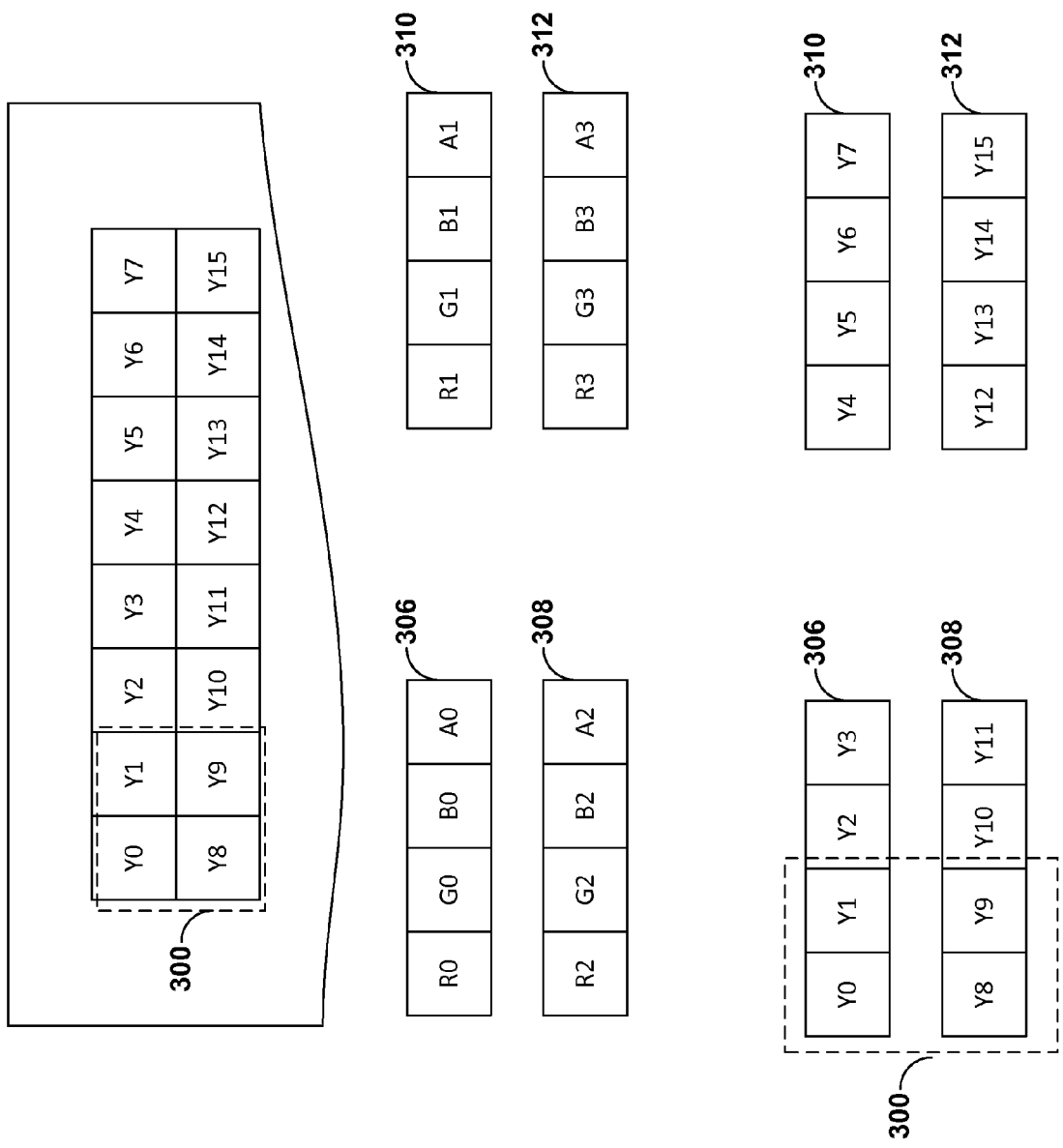
FIG. 13 is a conceptual diagram showing luma packing techniques of the disclosure.

FIG. 13 is a conceptual diagram showing luma packing techniques of the disclosure. In FIG. 13, block 300 of luma values Y0-Y15 are packed into RGBA color format data structures 306, 308, 310, 312. Color format data structures 306, 308, 310, 312 examples of data structures that may be processed by GPU 12 (e.g., by texture engine 39 of GPU 12). Typically, RGBA color format data structures 306, 308, 310, 312 would contain the RGBA component values for four pixels. Using the techniques described above, texture engine 39 would be configured to filter all RGBA color components of one pixel at the same time. In accordance with the packing techniques of this disclosure, four luma values of four different pixels may be packed into a single RGBA color format data structure so that the luma values of four different pixels may be filtered by texture engine 39 at the same time.

As shown in FIG. 13, block 300 consisting of luma values Y0, Y1, Y8, and Y9 would be packed into RGBA color format data structure 306 (corresponding to pixel P0 in FIG. 11) and RGBA color format data structure 308 (corresponding to pixel P2 in FIG. 11). More specifically, luma value Y0 would be packed into the R0 memory location of RGBA color format data structure 306, luma value Y1 would be packed into the G0 memory location of RGBA color format data structure 306, luma value Y8 would be packed into the R2 memory location of RGBA color format data structure 308, and luma value Y9 would be packed into the G2 memory location of RGBA color format data structure 308.

However, if luma values were packed as shown in FIG. 13, incorrect convolutional filtering may result. For example, as shown in FIG. 13, the four luma values corresponding to the R color component (i.e., Y0, Y4, Y8, Y12) would be filtered together. Instead, as shown in FIG. 12, luma component Y0, Y1, Y8 and Y9 should be filtered together.

Figure 14:
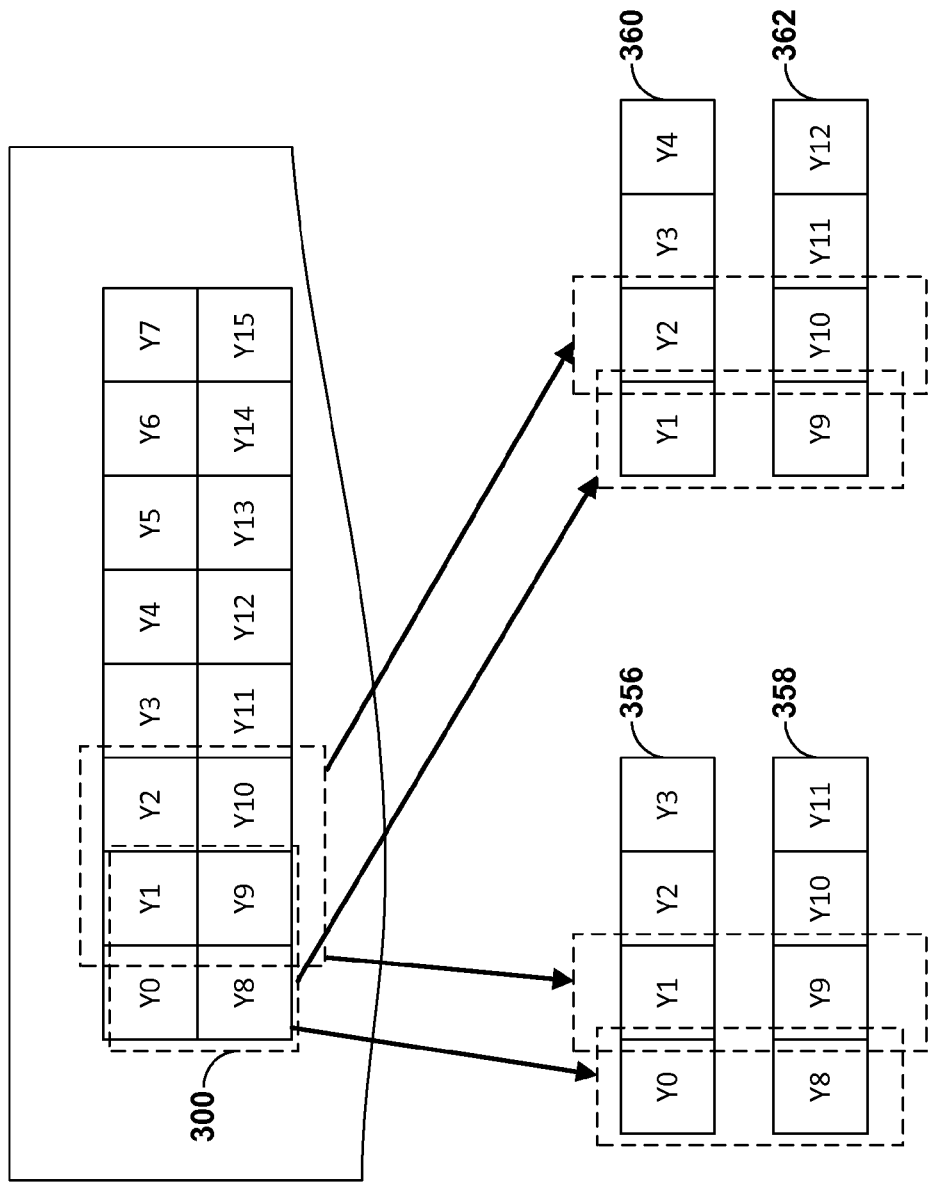
FIG. 14 is a conceptual diagram showing luma rearranging techniques of the disclosure.

In order to filter the correct luma components, the luma values may further be rearranged (also referred to as swizzled) as shown in FIG. 14. As shown in FIG. 14, rather than packing luma values by row (as in FIG. 13), luma values are packed by 2×2 blocks. Other packing and swizzling arrangements may be used depending on the type of filtering desired. As shown in FIG. 14, the luma components Y0, Y1, Y8, and Y9 are packed into the R component of data structures 356, 360, 358 and 362, respectively. Likewise, the luma components Y1, Y2, Y9, and Y10 are packed into the G component of data structures 356, 360, 358 and 362, respectively. The luma components Y2, Y3, Y10, and Y11 are packed into the B component of data structures 356, 360, 358 and 362, respectively. The luma components Y3, Y4, Y11, and Y11 are packed into the A component of data structures 356, 360, 358 and 362, respectively.

Figure 15:
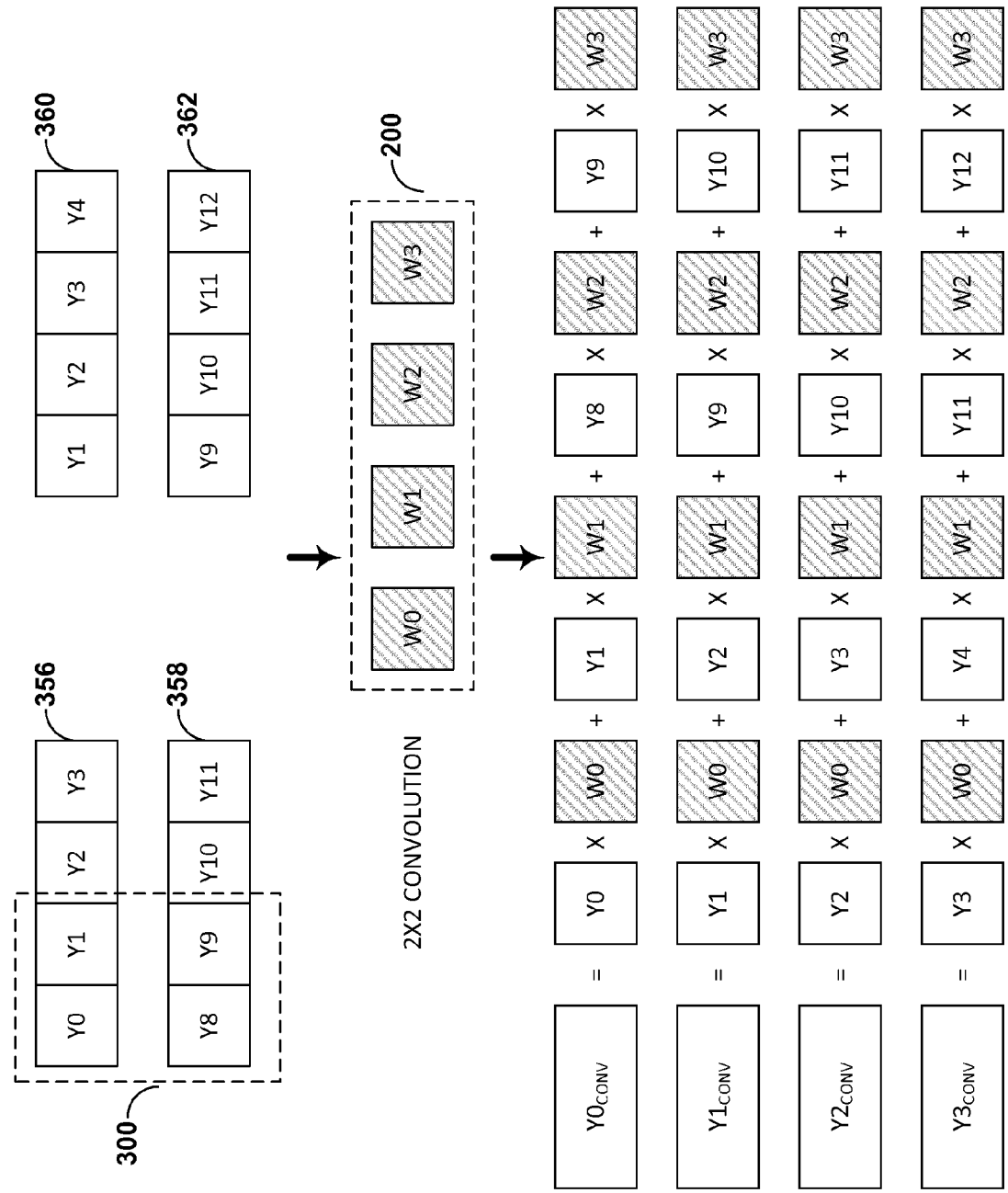
FIG. 15 is a conceptual diagram showing convolutional filtering techniques for a luma-based pixel format using the luma packing techniques of the disclosure.

Once the luma values are packed according to the techniques shown in FIG. 14, convolutional filtering may be applied to the packed RGBA color format data structures 356, 358, 360, and 362 in the same manner as described in FIG. 11. FIG. 15 is a conceptual diagram showing convolutional filtering techniques for a luma-based pixel format using the luma packing techniques of the disclosure. For example, FIG. 15 is similar to FIG. 11; however, FIG. 11 illustrates the example with RGBA, and FIG. 15 illustrates the example with luma values. Using the luma packing techniques of this disclosure, a four times throughput of filtering luma values can be achieved.

Figure 16:
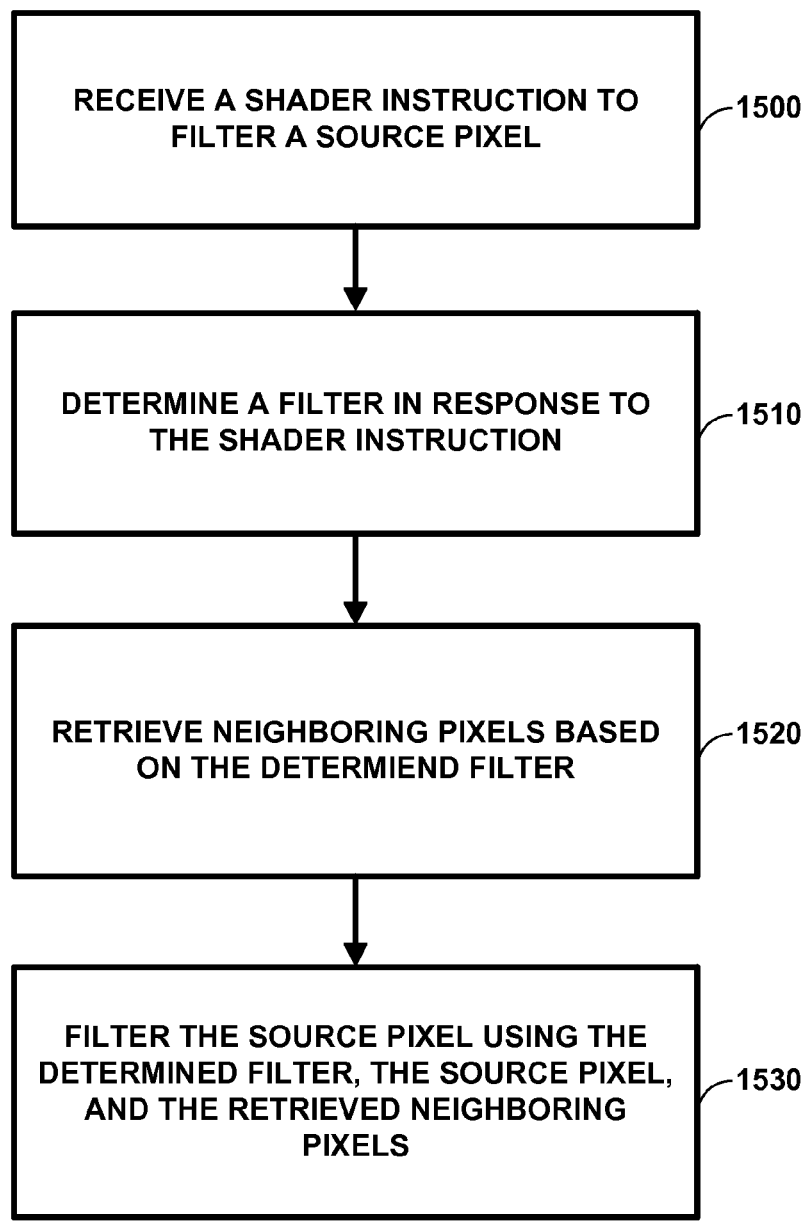
FIG. 16 is a flowchart showing an example method of the disclosure.

FIG. 16 is a flowchart showing an example method of the disclosure. The method of FIG. 16 may be carried out by one or more hardware units of GPU 12, including texture engine 39. FIG. 16 depicts a method for performing high ordering filtering in a GPU (e.g., GPU 12). The method comprises, receiving, by GPU 12, a shader instruction to filter a source pixel (1500). In one example of the disclosure, the shader instruction is a single shader instruction that identifies the source pixel to be filtered. GPU 12 may then determine a filter in response to the shader instruction (1510), and retrieve neighboring pixels based on the determined filter (1520). Texture engine 39 of GPU 12 may be configured to retrieve the neighboring pixels. Texture engine 39 may then filter the source pixel using the determined filter, the source pixel, and the retrieved neighboring pixels (1530).

In one example of the disclosure, GPU 12 may be configured to determine the filter by retrieving a filter type from a weight table register, retrieving a filter kernel size from the weight table register, and retrieving pre-computed filter weights from the weight table register based on the filter kernel type and the filter kernel size. In another example of the disclosure, GPU 12 may be configured to retrieve the neighboring pixels based on the filter kernel size.

In one example of the disclosure, the filter type in the weight table register may include one or more of an indication of a separable filter, an indication of a isotropic filter, an indication of a subpixel filter, and an indication of a symmetric filter. In another example of the disclosure a total number of retrieved pre-computed filter weights from the weight table register is dependent on one of more of the indication of a separable filter, the indication of a isotropic filter, the indication of a subpixel filter, and the indication of a symmetric filter. In this regard, GPU 12 may be further configured to derive additional filter weights based on the retrieved pre-computed filter weights and the determined filter type in case that the total number of retrieved pre-computed filter weights is less than the kernel size.

In another example of the disclosure, GPU 12 may be configured to apply convolutional filtering to the source pixel and retrieved neighboring pixels in an RGBA color format data structure. Further in this regard, GPU 12 may be configured to pack luma values of the source pixel and the retrieved neighboring pixel in an RGBA color format data structure, wherein four luma values are filtered for each RGBA color format data structure. In another example of the disclosure, GPU 12 may be configured to convert the source pixel and retrieved neighboring pixels from an RGBA color format to a color format using the luma values.

Figure 17:
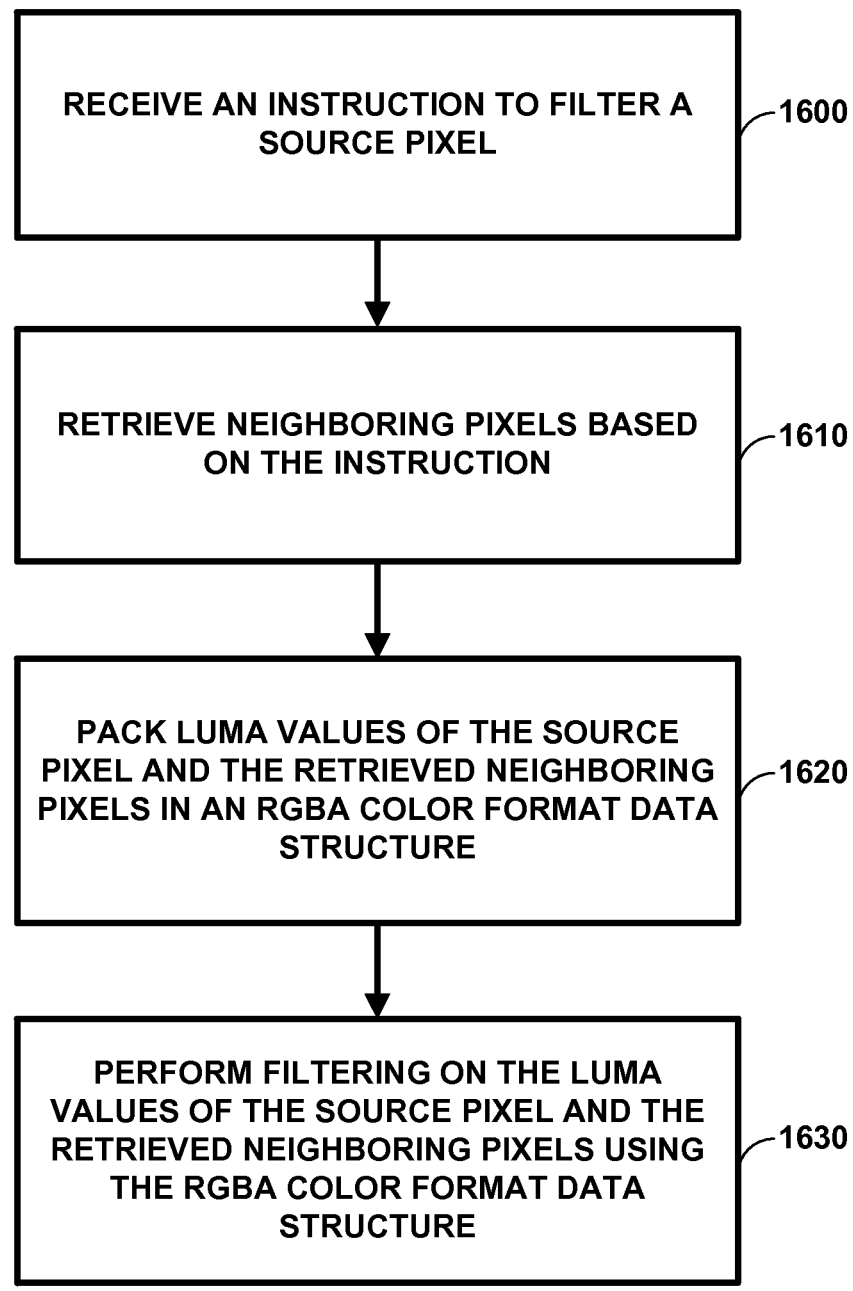
FIG. 17 is a flowchart showing an example method of the disclosure.

FIG. 17 is a flowchart showing an example method of the disclosure. The method of FIG. 17 may be carried out by one or more hardware units of GPU 12, including texture engine 39. FIG. 17 depicts a method of filtering in a GPU (e.g., GPU 12). GPU 12 may be configured to receive an instruction to filter a source pixel (1600). In one example of the disclosure, the instruction is a single shader instruction. GPU 12 may be further configured to retrieve neighboring pixels based on the instruction (1610), and pack luma values of the source pixel and the retrieved neighboring pixels in an RGBA color format data structure (1620). GPU 12 (e.g., with texture engine 39) may be further configured to perform filtering on the luma values of the source pixel and the retrieved neighboring pixels using the RGBA color format data structure (1630), wherein four luma values are filtered for each RGBA color format data structure. In one example of the disclosure, performing filtering comprises performing convolutional filtering.

In one example of the disclosure, GPU 12 is further configured to retrieve filter weights based on the instruction. In another example of the disclosure, GPU 12 is configured to generate filter weights based on the instruction. In another example of the disclosure, GPU 12 is configured to convert the source pixel and retrieved neighboring pixels from an RGBA color format to a color format using the luma values. In another example of the disclosure, GPU 12 is configured to determine the filter in response to the single shader instruction. In another example of the disclosure, GPU 12 is configured to retrieve a filter type from a weight table register, retrieve a filter kernel size from the weight table register, and retrieve pre-computed filter weights from the weight table register based on the filter kernel type and the filter kernel size.

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of filtering in a graphics processing unit (GPU), the method comprising:
   receiving, by the GPU, an instruction to filter a source pixel;
   retrieving, by the GPU, neighboring pixels based on the instruction;
   packing, by the GPU, luma values of the source pixel and the retrieved neighboring pixels in an RGBA color format data structure; and
   performing, by the GPU, filtering on the luma values of the source pixel and the retrieved neighboring pixels using the RGBA color format data structure, wherein four luma values of four different source pixels are filtered for each single RGBA color format data structure so that the luma values of the four different source pixels are filtered at the same time.

2. The method of claim 1, wherein performing filtering comprises performing convolutional filtering.

3. The method of claim 1, wherein performing filtering comprises performing filtering by a texture engine of the GPU.

4. The method of claim 1, further comprising:
   retrieving filter weights based on the instruction.

5. The method of claim 1, further comprising:
   generating filter weights based on the instruction.

6. The method of claim 1, further comprising:
   converting the source pixel and retrieved neighboring pixels from an RGBA color format to a color format using the luma values.

7. The method of claim 1, wherein the instruction is a single shader instruction.

8. The method of claim 7, further comprising:
   determining, by the GPU, the filter in response to the single shader instruction.

9. The method of claim 8, wherein determining the filter comprises:
   retrieving a filter type from a weight table register;
   retrieving a filter kernel size from the weight table register; and
   retrieving pre-computed filter weights from the weight table register based on the filter type and the filter kernel size.

10. An apparatus configured to perform filtering, the apparatus comprising:
    a memory configured to store graphics data; and
    a graphics processing unit (GPU) configured to perform filtering on the graphics data, the GPU further configured to:
    receive an instruction to filter a source pixel;
    retrieve neighboring pixels based on the instruction;
    pack luma values of the source pixel and the retrieved neighboring pixels in an RGBA color format data structure; and
    perform filtering on the luma values of the source pixel and the retrieved neighboring pixels using the RGBA color format data structure, wherein four luma values of four different source pixels are filtered for each single RGBA color format data structure so that the luma values of the four different source pixels are filtered at the same time.

11. The apparatus of claim 10, wherein the GPU is configured to perform filtering by performing convolutional filtering.

12. The apparatus of claim 10, further comprising:
    a texture engine configured to perform the filtering.

13. The apparatus of claim 10, wherein the GPU is further configured to:
    retrieve filter weights based on the instruction.

14. The apparatus of claim 10, wherein the GPU is further configured to:
    generate filter weights based on the instruction.

15. The apparatus of claim 10, wherein the GPU is further configured to:
    convert the source pixel and retrieved neighboring pixels from an RGBA color format to a color format using the luma values.

16. The apparatus of claim 10, wherein the instruction is a single shader instruction.

17. The apparatus of claim 16, wherein the GPU is further configured to:
    determine, by the GPU, the filter in response to the single shader instruction.

18. The apparatus of claim 17, wherein the GPU is further configured to:
    retrieve a filter type from a weight table register;
    retrieve a filter kernel size from the weight table register; and retrieve pre-computed filter weights from the weight table register based on the filter type and the filter kernel size.

19. An apparatus configured to perform filtering, the apparatus comprising:
   means for receiving an instruction to filter a source pixel;
   means for retrieving neighboring pixels based on the instruction;
   means for packing luma values of the source pixel and the retrieved neighboring pixels in an RGBA color format data structure; and
   means for performing filtering on the luma values of the source pixel and the retrieved neighboring pixels using the RGBA color format data structure, wherein four luma values of four different source pixels are filtered for each single RGBA color format data structure so that the luma values of the four different source pixels are filtered at the same time.

20. The apparatus of claim 19, wherein the means for performing filtering comprises means for performing convolutional filtering.

21. The apparatus of claim 19, wherein the means for performing filtering is performed by a texture engine of a graphics processing unit (GPU).

22. The apparatus of claim 19, further comprising:
   means for retrieving filter weights based on the instruction.

23. The apparatus of claim 19, further comprising:
   means for generating filter weights based on the instruction.

24. The apparatus of claim 19, further comprising:
   means for converting the source pixel and retrieved neighboring pixels from an RGBA color format to a color format using the luma values.

25. The apparatus of claim 19, wherein the instruction is a single shader instruction.

26. The apparatus of claim 25, further comprising:
   means for determining, by the GPU, the filter in response to the single shader instruction.

27. The apparatus of claim 26, wherein the means for determining the filter comprises:
   means for retrieving a filter type from a weight table register;
   means for retrieving a filter kernel size from the weight table register; and
   means for retrieving pre-computed filter weights from the weight table register based on the filter type and the filter kernel size.

28. A non-transitory computer-readable storage medium storing instructions that, when executed, cause one or more processors of a device configured to perform filtering to:
   receive an instruction to filter a source pixel;
   retrieve neighboring pixels based on the instruction;
   pack luma values of the source pixel and the retrieved neighboring pixels in an RGBA color format data structure; and
   perform filtering on the luma values of the source pixel and the retrieved neighboring pixels using the RGBA color format data structure, wherein four luma values of four different source pixels are filtered for each single RGBA color format data structure so that the luma values of the four different source pixels are filtered at the same time.

* * * * *